(12) United States Patent
Dahlman

(10) Patent No.: US 9,239,079 B2
(45) Date of Patent: Jan. 19, 2016

(54) FLANGED BEARING RING AND METHOD FOR PRODUCING SUCH A FLANGED BEARING RING

(75) Inventor: Patrik Dahlman, Partille (SE)

(73) Assignee: AKTIEBOLAGET SKF, Gothenburg (SE)

( * ) Notice: Subject to any disclaimer, the term of this patent is extended or adjusted under 35 U.S.C. 154(b) by 188 days.

(21) Appl. No.: 13/876,533

(22) PCT Filed: Sep. 22, 2011

(86) PCT No.: PCT/SE2011/000164
§ 371 (c)(1),
(2), (4) Date: Mar. 28, 2013

(87) PCT Pub. No.: WO2012/044224
PCT Pub. Date: Apr. 5, 2012

(65) Prior Publication Data
US 2013/0182988 A1 Jul. 18, 2013

(30) Foreign Application Priority Data
Sep. 28, 2010 (SE) ...................................... 1000962

(51) Int. Cl.
*F16C 33/58* (2006.01)
*B21D 53/10* (2006.01)
*B23K 11/04* (2006.01)
*B23K 11/16* (2006.01)
*F16C 33/64* (2006.01)

(52) U.S. Cl.
CPC .............. *F16C 33/583* (2013.01); *B21D 53/10* (2013.01); *B23K 11/04* (2013.01); *B23K 11/046* (2013.01); *B23K 11/16* (2013.01); *F16C 33/64* (2013.01); *B23K 2201/04* (2013.01); *B23K 2201/20* (2013.01); *B23K 2203/04* (2013.01)

(58) Field of Classification Search
USPC ................. 384/275, 296, 510, 537, 544, 589; 29/898.06, 898.066, 894.361, 894.36; 305/105.1
See application file for complete search history.

(56) References Cited

U.S. PATENT DOCUMENTS

| | | | | |
|---|---|---|---|---|
| 1,693,067 | A * | 11/1928 | Williams | 29/894.361 |
| 1,931,161 | A * | 10/1933 | Kranz et al. | 29/894.362 |
| 3,387,900 | A | 6/1968 | Morrison | |
| 3,522,644 | A * | 8/1970 | Cavagnero | 29/898.066 |
| 3,583,511 | A * | 6/1971 | Asberg | 180/370 |
| 4,571,099 | A * | 2/1986 | Balken et al. | 384/513 |
| 6,929,331 | B2 * | 8/2005 | Ohtsuki | 301/105.1 |
| 7,604,416 | B2 | 10/2009 | Niebling et al. | |
| 2007/0086690 | A1 * | 4/2007 | Niebling et al. | 384/544 |

FOREIGN PATENT DOCUMENTS

| | | |
|---|---|---|
| DE | 102005014967 A1 | 10/2006 |
| GB | 1141901 A | 2/1969 |

*Primary Examiner* — Thomas Diaz
(74) *Attorney, Agent, or Firm* — Bryan Peckjian; SKF USA Inc. Patent Dept.

\* cited by examiner

(57) ABSTRACT

The invention relates to a flanged bearing ring produced from a high carbon steel profile bar comprising at least one flash butt welded joint, where the bearing ring is provided with an inner peripheral surface and an outer peripheral surface and where one peripheral surface comprises a raceway for rolling elements, where the bearing ring further comprises a flange adapted for fixing the bearing ring to a mechanical member, where the flange protrudes from the bearing ring in a substantially radial direction. The invention further relates to a method for producing such a homogenous flanged bearing ring from a straight profile bar. The advantage of the invention is that a homogenous flanged bearing ring is obtained in a simple and cost-effective way.

8 Claims, 3 Drawing Sheets

FLANGED BEARING RING AND METHOD FOR PRODUCING SUCH A FLANGED BEARING RING

CROSS-REFERENCE

This application is the U.S. national stage of International Application No. PCT/SE2011/000164 filed on Sep. 22, 2011, which claims priority to Swedish Application No. SE10000962-9 filed Sep. 28, 2010, both of which are herein incorporated by reference in their entirety.

TECHNICAL FIELD

The present invention relates to a homogenous roller bearing ring comprising a flange. The invention further relates to a method for producing a homogenous bearing ring with a flange in a cost-effective way.

BACKGROUND ART

Bearings are generally used to support and hold a rotating member attached to a non-rotating member. This can be e.g. a wheel on a vehicle, a vane on a wind turbine or a drum in a washing machine. During use, the bearing is subjected to different loads, both static and dynamic. The static load is mainly due to the weight of the machine, while the dynamic loads are due to the working conditions of the machine. A bearing comprises an outer ring with an outer raceway, an inner ring with an inner raceway and rolling elements.

Some bearings are provided with a flange, either on the outer ring or on the inner ring. The flange may be used to aid the positioning of the bearing, or may be used for mounting the bearing.

A flange is normally machined together with the bearing ring. This is not a problem for small bearings, but for larger bearings, with a diameter of more than 0.5 meters, such a traditional method of machining a flanged bearing ring is very expensive. Machine and tool cost are high, and the cost due to the time needed to remove all excess material is also very high, since the bearing is machined form a single piece of metal. Further, the material waste is huge, which is also a drawback when it comes to cost and to a sustainability perspective.

It is known to join a separate flange to a bearing ring. The bearing ring is machined separately and may be provided with some adaptations, such as grooves or protrusions, which will make the joining easier. The flange is machined as a separate part and is joined to the bearing ring by welding. It is however difficult to achieve the required mechanical properties for a welded bearing ring joint. The welded joint region will have different mechanical characteristics, which will constitute a weakening. Such a bearing must thus be dimensioned accordingly, which means that the bearing will be larger and heavier than a non-welded bearing adapted for the same load.

There is thus room for an improved flanged bearing ring and for a method for producing such a flanged bearing ring.

DISCLOSURE OF INVENTION

An object of the invention is therefore to provide a bearing ring comprising a flange produced from a high carbon steel profile bar, where the bearing ring comprises at least one flash butt welded joint, such that a homogenous flanged bearing ring is obtained. A further object of the invention is to provide a method for producing such a homogenous flanged bearing ring.

With a bearing ring produced from a high carbon steel profile bar comprising at least one flash butt welded joint, where the bearing ring is provided with an inner peripheral surface and an outer peripheral surface and where one peripheral surface comprises a raceway for rolling elements, the object of the invention is achieved in that the bearing ring further comprises a roll formed flange adapted for mounting the bearing ring to a mechanical member, where the flange protrudes from the bearing ring in a substantially radial direction.

By this first embodiment of the bearing ring according to the invention, a bearing ring comprising a flange where the bearing ring and the flange are made from the same piece of high carbon steel material is provided. In this way, a homogenous flanged bearing ring is provided for, which will enhance the properties of the bearing ring. Since no filler material is used for the flash butt welding, the welding joint will only comprise the same material as the rest of the bearing ring. The properties of the joint will be somewhat different right after the flash butt weld procedure, due to the high temperature created during welding, but since the material is homogeneous, the differences will disappear after an appropriate heat treatment. The bearing ring and the flange are preferably formed by roll forming, where a profiled bar is created. The profiled bar may be substantially straight or may be formed as a curved member.

In an advantageous further development of the flanged bearing ring according to the invention, the flange extends radially outwards from the bearing ring, in a direction from the centre of the bearing ring. When the flange protrudes from an outer bearing ring, this will increase the outer dimension of the bearing, which will provide a mounting flange for the bearing. The flange may also extend outwards from the inner bearing ring. In this way, the flange may also be used as a mounting flange for the roller bearing.

In an advantageous further development of the flanged bearing ring according to the invention, the inner diameter of the bearing ring is larger than 0.5 meters. Smaller bearing rings are cheaper and easier to machine from a single piece of metal, but with increased size, the cost for machining a bearing ring from a single piece increases exponentially. For bearing rings with an inner diameter of 0.5 meters and more, the cost for forming a profiled bar and to flash butt weld the bar to a bearing ring will be in the same magnitude or lower.

In an advantageous further development of the flanged bearing ring according to the invention, the bearing ring comprises a plurality of ring segments that are flash butt welded together. The bearing ring may comprise two semi-circular ring segments, or more ring segments, welded together to form the bearing ring. The ring segments may be welded together at the same time, thereby forming the flanged bearing ring directly. This is of advantage since shorter bar segments are easier to handle and to form, e.g. to bend to a circular shape.

In the inventive method for producing a flanged bearing ring, the steps of forming a flanged profile bar, bending the straight profile bar to an annular member and welding the two end regions of the annular member together by flash butt welding are comprised.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
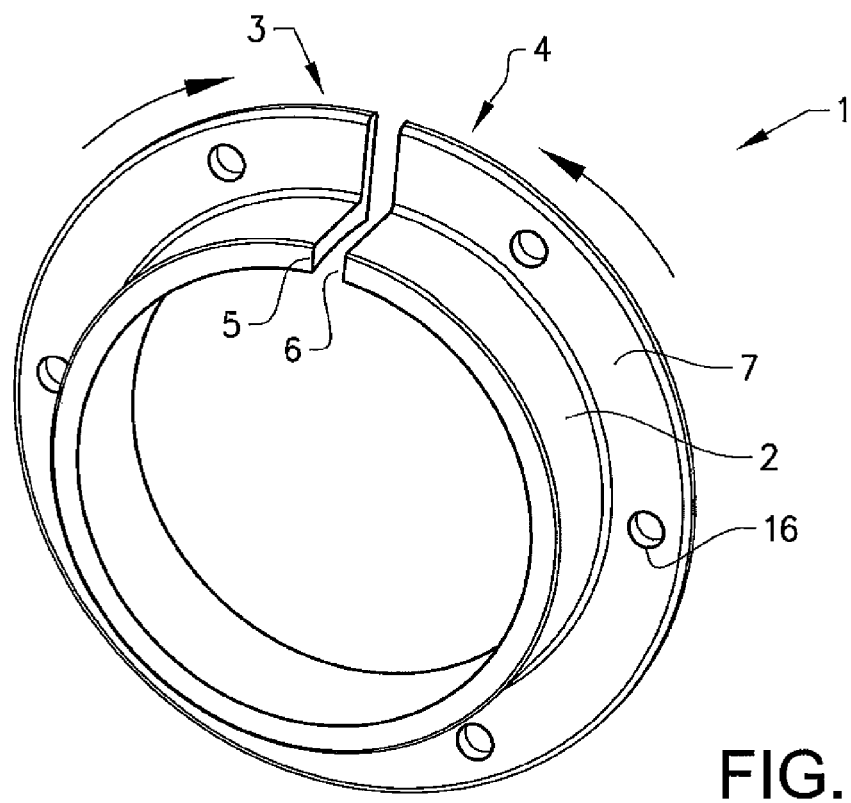
FIG. 1 shows a profiled bar formed as a flanged bearing ring prior to the joining of the bearing ring according to the invention.
Figure 2:
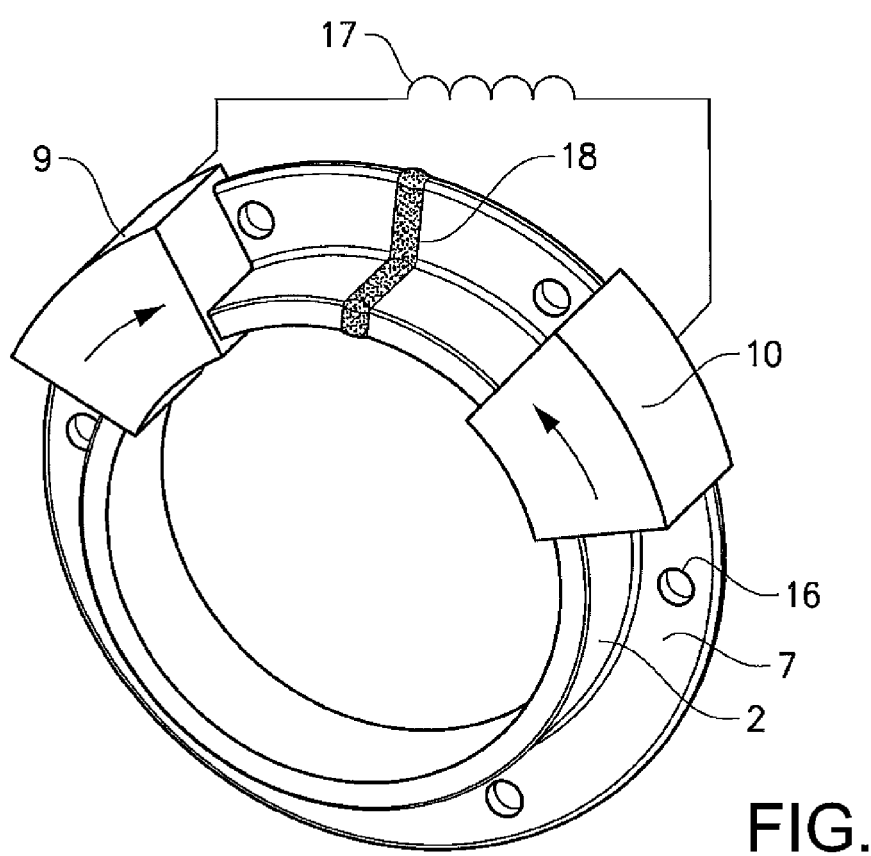
FIG. 2 shows the profiled bar during the joining of the flanged bearing ring according to the invention.
Figure 3:
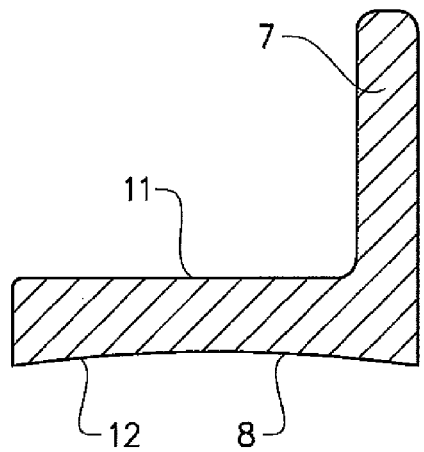
FIG. 3 shows a cross-section through a first example of a flanged bearing ring according to the invention.

FIGS. 1 and 2 show an example of the production of a flanged bearing ring. In the shown example, the two end regions of an outer bearing ring are joined together. An inner bearing ring is made in the same way. The bearing ring 1 is formed from high carbon steel having the required mechanical properties for a bearing ring regarding e.g. strength, hardness and elasticity. The carbon content of the high carbon steel used for bearing rings is greater than 0.67%. The bearing ring is formed from a profiled bar having a cross-section that corresponds to the cross-section of the wanted flanged bearing ring. The profiled bar is formed by a roll forming process, where the profile is roll formed in a hot or cold process. The profiled bar may be straight or curved. The roll forming of a profiled bar creates an advantageous flow of material compared to machining, which will improve the durability and load capacity. The flange may be formed at the same time as the race profile for the roller elements, or may be formed in a consecutive process. FIG. 3 shows a cross-section of the bearing ring used as an example in FIGS. 1 and 2.

The flange 7 extends radially outwards from the outer peripheral surface 11 of the, in this example, outer bearing ring. The inner peripheral surface 12 of the outer bearing ring is provided with a raceway 8. The size and shape of the flange 7 is chosen depending on the requirements of the flange and the bearing ring. The flange may extend relatively far out and be provided with holes for mounting purposes, or may be relatively low but wide for a different mounting. The flange itself may also be formed with different profiles, depending on the intended use. In the shown example, the flange is provided with mounting holes 16. The mounting holes may either be formed in the straight profile before the bearing ring is welded together, e.g. by drilling or routing, or may be formed in the flange after the bearing ring is joined together.

When the flanged bearing ring has reached its final shape, it is bent to an annular member 2 having a first end region 3 with a first end surface 5 and a second end region 4 with a second end surface 6 abutting each other. The bearing ring is placed in a flash butt welding machine having a first clamping tool 9 and a second clamping tool 10. The clamping tools are connected to the secondary coil 17 of a welding transformer that will provide the current for the flash butt welding. Before the welding, the two end regions are pushed against each other by the clamping tools. During the welding, electric power is applied to the clamps and the end regions will heat up rapidly due to the electric power. At the same time, the clamps are pushed further together, thereby creating a joint in the weld zone 18 joining the bearing ring. During the flash butt welding, the end surfaces will be heated up and some excessive material will be pushed out to the sides of the weld zone by the pressure exerted by the clamping tools. The excessive material will comprise impurities and oxidized material which are thus forced out of the weld zone, leaving a joint with essentially the same characteristics as the rest of the bearing ring material. The excessive material is machined away in a later operation, leaving a bearing ring with the same cross section all around. Since no filler material is used, the composition of the material will be homogenous throughout the entire bearing ring. By heat treating the bearing ring, the mechanical properties will also even out throughout the material, such that a flanged bearing ring consisting of a homogeneous material without any weaker regions is obtained.

Regular welding using filler materials will not give a satisfactory result when welding a flange to a bearing ring. This is partly due to the fact that high carbon steel that is used in bearing rings is very difficult to weld using a filler material. The filler material will inevitably create a joint region between the bearing ring and the flange with different characteristics that will constitute a weak point of the flanged bearing ring. Such a flanged bearing ring may possibly be used for low cost and low performance roller bearings. Another advantage of using flash butt welding is that since the end regions are pressed together and the material will flow some, the end surfaces must not be completely parallel prior to the welding. Thus, the cut of the profiled bar must not be exactly correct and flanged bearing rings having different diameters can use the same angular cut.

FIGS. 3 through 7 show different examples of a flanged bearing ring. FIG. 3 shows a cross-section of a first example of an outer bearing ring, where the flange 7 is positioned at one of the edges of the outer surface 11 of the outer bearing ring. The inner surface 12 of the outer bearing ring is provided with a raceway 8. The flange is relatively high and narrow. Such a shape may be provided with mounting holes for mounting purposes. It may also be mounted and/or positioned to a mechanical member by a clamping action.

Figure 4:
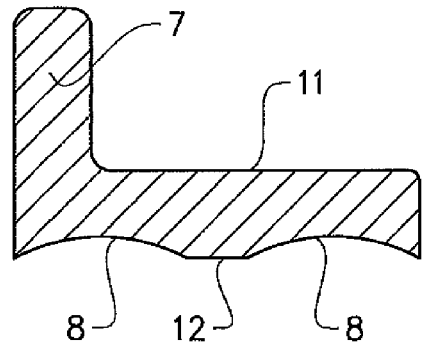
FIG. 4 shows a cross-section through another example of a flanged bearing ring according to the invention.

FIG. 4 shows a cross-section of another example of a flanged outer bearing ring, where the flange is positioned at one of the edges of the outer surface 11 of the outer bearing ring and where the flange 7 is relatively low and wider. Such a shape may be used for mounting purposes, either by mounting holes or by a clamping action, using clamping tools. The inner peripheral surface 12 of the bearing ring is here provided with two raceways 8.

Figure 5:
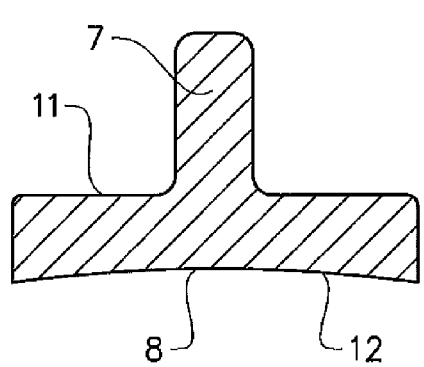
FIG. 5 shows a cross-section through another example of a flanged bearing ring according to the invention.

FIG. 5 shows a cross-section of another example of a flanged outer bearing ring, where the flange 7 is positioned at the centre of the outer surface 11 of the outer bearing ring. The inner peripheral surface 12 is provided with a raceway 8. Such a flange may be used for mounting purposes and may be provided with mounting holes. It may also be mounted and/or positioned to a mechanical member by a clamping action.

Figure 6:
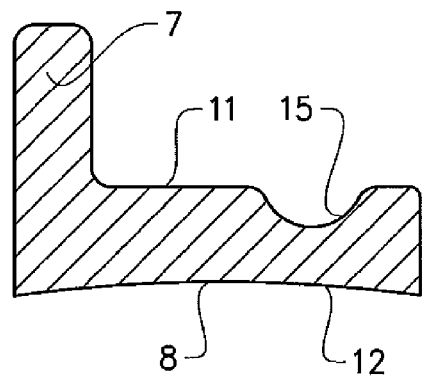
FIG. 6 shows a cross-section through another example of a flanged bearing ring according to the invention.

FIG. 6 shows a cross-section of another example of a flanged outer bearing ring, where the flange 7 is positioned at one of the edges of the outer surface 11 of the outer bearing ring. In this example, the bearing ring itself is also provided with an additional mounting structure in the form of a groove 15 which can also be used for mounting purposes. The groove may be formed through e.g. a rolling operation or machining. Another additional mounting structure is also conceivable, such as a ridge, an additional small flange or a peripheral recess at the edge of the bearing ring.

Figure 7:
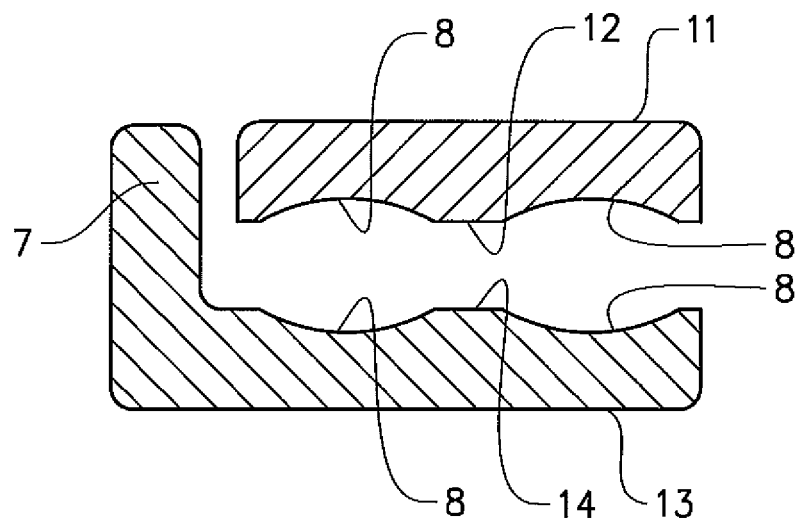
FIG. 7 shows a cross-section through another example of a flanged bearing ring according to the invention.

FIG. 7 shows a cross-section of a flanged inner bearing ring. The inner bearing ring comprises an outer peripheral surface 13 and an inner peripheral surface 14 which in this example is provided with two raceways 8. In this example, the flange 7 is positioned at one of the edges of the inner surface 14 of the inner bearing ring and extends in the direction towards the outer bearing ring. The flange extends such that the complete space between the outer and inner ring is covered. Such a flange may be used for mounting purposes, e.g. to mount a rotating member such as a wheel when the outer ring is fixed in a housing structure. The outer bearing ring is provided with an outer surface 11 and an inner surface 12 which in this example is provided with two raceways 8.

An inventive flanged bearing ring is advantageously used for larger flanged bearing rings, having an inner diameter in the region of above 0.5 meters and more. One reason for this is that such large bearing rings are expensive to produce from a single block of material, since the complete bearing ring including the flange must be machined from the single block. The inventive flanged bearing ring is much cheaper to produce since a large waste of material can be avoided. A rolling bearing comprising such a flanged bearing ring is especially suitable for use in heavy industry, such as for the main shaft and gearbox in wind turbine applications and for paper rollers in paper machines.

In a further embodiment, the bearing ring comprises two or more flanged ring segments that are flash butt welded together to form the bearing ring. The bearing ring may of course also be made from more than two segments, such as three 120 degrees segments or four 90 degrees segments. One reason for using several flanged ring segments is that it may be easier to produce the smaller ring segments, e.g. to bend a shorter segment 90 degrees is easier than to bend a longer segment 360 degrees. This will also make it easier to provide a high accuracy for the flanged bearing ring, especially for the roundness of the bearing ring and for the flatness of the flange. The two or more flanged ring segments may be flash butt welded at the same time to form the flanged bearing ring directly or may be flash butt welded consecutively, one after the other, to form the annular member.

Figure 8:
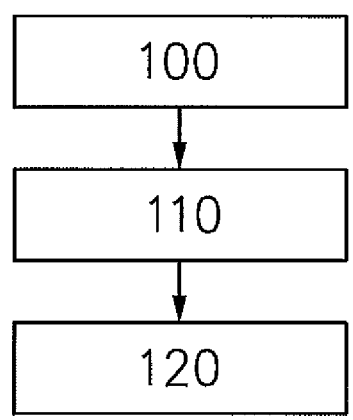
FIG. 8 shows a flow chart of the inventive method.

An embodiment of the inventive method for producing a flanged bearing ring is described by the flow chart of FIG. 8. In the first step 100, a profile bar including a flange is formed from a high carbon steel bar prior to the bending of the straight profile bar. The straight profile bar may be manufactured in different ways, as described above, and is preferably roll formed.

In step 110, the profile bar is bent to an annular member having substantially the same shape as the bearing ring will have after the joining of the two end regions. The annular member may be bent either such that the end surfaces are preloaded against each other or such that there is a small distance between them before the joining has started. The annular member may also comprise two or more ring segments that is flash butt welded together to form the annular member.

In step 120, the end regions of the annular member are welded to each other by a flash butt welding process.

The invention is not to be regarded as being limited to the embodiments described above, a number of additional variants and modifications being possible within the scope of the subsequent patent claims.

REFERENCE SIGNS

1: Bearing ring
2: Profile bar
3: First end region
4: Second end region
5: First end surface
6: Second end surface
7: Flange
8: Raceway
9: First clamping tool
10: Second clamping tool
11: Outer ring outer surface
12: Outer ring inner surface
13: Inner ring outer surface
14: Inner ring inner surface
15: Groove
16: Mounting hole
17: Coil
18: Weld zone

The invention claimed is:

1. A method of providing a bearing ring produced from at least three high carbon steel profile bars and having at least three flash butt welded joints, the method comprising the steps of:
   forming the at least three profile bars to each include a flange formed by roll forming, the at least three profile bars each having two end regions;
   bending the at least three profile bars such that the at least three profile bars each have a respective degree of arc, wherein a total degree of arc calculated by adding the respective degree of arcs from each of the at least three profile bars equaling three-hundred sixty (360) degrees after the below step of simultaneously flash butt welding such that an annular member is formed upon securing of the two end regions of each of the at least three profile bars to a respective one of the two end regions of a different one of the at least three profile bars, the annular member forms a bearing ring, wherein the bearing ring comprises:
      an inner peripheral surface and
      an outer peripheral surface, and wherein
      one peripheral surface provides a raceway for rolling elements, wherein
      the bearing ring further includes the flange being adapted for mounting the bearing ring to a mechanical member, and wherein
      the flange protrudes from an axial end of the bearing ring in a substantially radial direction;
   connecting at least one clamping tool to each of the at least three profile bars, the at least one clamping tool adapted to push each of the two end regions of each of the at least three profile bars against the respective one of the two end regions of the different one of the at least three profile bars such that the annular member is formed, the at least one clamping tool further adapted to supply a current to the at least three profile bars,
   simultaneously flash butt welding the two end regions of each of the at least three profile bars to form the annular member by supplying the current through each of the at least one clamping tool;
   heat treating the bearing ring after the flash butt welding.

2. The method according to claim 1, wherein the step of bending the at least three profile bars further comprises the flange being positioned at an outer edge of the bearing ring.

3. The method according to claim 1, wherein the step of bending the at least three profile bars further comprises the flange being provided with a plurality of mounting holes.

4. The method according to claim 1, wherein the step of forming the at least three profile bars further comprises the carbon content of the high carbon steel being greater than 0.67%.

5. A method of providing a rolling bearing having at least one bearing ring, the method comprising the steps of:
   forming at least three profile bars to each include a flange formed by roll forming, the at least three profile bars each having two end regions;
   bending the at least three profile bars such that the at least three profile bars each have a respective degree of arc, wherein a total degree of arc calculated by adding the respective degree of arcs from each of the at least three profile bars equaling three-hundred sixty (360) degrees after the below step of simultaneously flash butt welding such that an annular member is formed upon securing of the two end regions of each of the at least three profile bars to a respective one of the two end regions of a different one of the at least three profile bars, the annular member forms a bearing ring, wherein the bearing ring comprises:
      an inner peripheral surface, and
      an outer peripheral surface, and wherein
      one peripheral surface provides a raceway for rolling elements, wherein
      the bearing ring further includes the flange being adapted for mounting the bearing ring to a mechanical member, and wherein
      the flange protrudes from an axial end of the bearing ring in a substantially radial direction;
   connecting at least one clamping tool to each of the at least three profile bars, the at least one clamping tool adapted to push each of the two end regions of each of the at least three profile bars against the respective one of the two end regions of the different one of the at least three profile bars such that the annular member is formed, the at least one clamping tool further adapted to supply a current to the at least three profile bars,
   simultaneously flash butt welding the two end regions of each of the at least three profile bars to form the annular member by supplying the current through each of the at least one clamping tool;
   heat treating the bearing ring after the flash butt welding.

6. The method according to claim 5, where the step of bending the at least three profile bars further comprises an inner diameter of the rolling bearing being larger than 0.5 meters.

7. A method for producing a homogenous flanged high carbon steel bearing ring, comprising the steps of:
   forming at least three profile bars to each include a flange from a high carbon steel bar by roll forming, the at least three profile bars each having two end regions,
   bending the at least three profile bars to a ring segment, wherein an annular member is formed upon securing of the two end regions of each of the at least three ring segments to a respective one of the two end regions of a different one of the at least three ring segments,
   connecting at least one clamping tool to each of the at least three ring segments, the at least one clamping tool adapted to push each of the two end regions of each of the at least three ring segments against the respective one of the two end regions of the different one of the at least three ring segments such that the annular member is formed, the at least one clamping tool further adapted to supply a current to the at least three profile bars,
   simultaneously welding the two end regions of the at least three ring segments together by flash butt welding by supplying the current through each of the at least one clamping tool;
   heat treating the annular member after the flash butt welding.

8. The method according to claim 7, wherein the at least three profile bars including the flange is formed from a substantially straight high carbon steel bar.

* * * * *